Nov. 21, 1944.  E. A. TERRELL  2,363,161
VARIABLE SPEED MECHANISM
Filed Feb. 16, 1942   2 Sheets—Sheet 1

Inventor
Edgar A. Terrell,
by Robert K. Randall,
Att'y.

Nov. 21, 1944.  E. A. TERRELL  2,363,161

VARIABLE SPEED MECHANISM

Filed Feb. 16, 1942  2 Sheets-Sheet 2

Inventor
Edgar A. Terrell,
by Robert K. Randall
Att'y.

Patented Nov. 21, 1944

2,363,161

UNITED STATES PATENT OFFICE 2,363,161

VARIABLE SPEED MECHANISM

Edgar A. Terrell, Charlotte, N. C., assignor to The Terrell Machine Company, Charlotte, N. C., a corporation of North Carolina Application February 16, 1942, Serial No. 431,040

8 Claims. (Cl. 74—393)

This invention relates to variable speed mechanisms, particularly such as are adapted for insertion in the trains of change-gearing present in a wide variety of machines such as lathes and other machine tools. There are a number of operations which can be performed upon lathes and other machine tools if a continuously changing ratio can be secured between the rate of rotation of the work and the rate of traverse of the tool, or between the rates of other relative movements of the tool with respect to the work. To be useful, the rate of change must both be known and capable of intentional variation, in order to give predictable results.

The invention has among its objects the provision of a variable speed mechanism of new and improved construction adapted to the purposes just stated, and which additionally shall be capable of insertion as a unit into the compound gearing of a lathe or other machine tool or any other machine where its functions are needed, and where it can optionally be quickly brought into action to introduce a changing ratio into the operations of the machine tool, or as quickly be rendered idle so as to allow the machine tool to operate in conventional manner, without having to remove the unit from the machine. A further aim is to provide a device for imparting a continuously varying rate of actuation to a machine part from a source of power of constant speed, in which the rate of variation shall be infinitely adjustable within the limits of capability of the particular unit, instead of being confined to one or more set rates of change.

The manner of attainment of these and other objects of the invention is as made plain hereinafter.

An illustrative embodiment of the invention is shown in the accompanying drawings, in which, Fig. 1 is a plan view.

Figure 1:
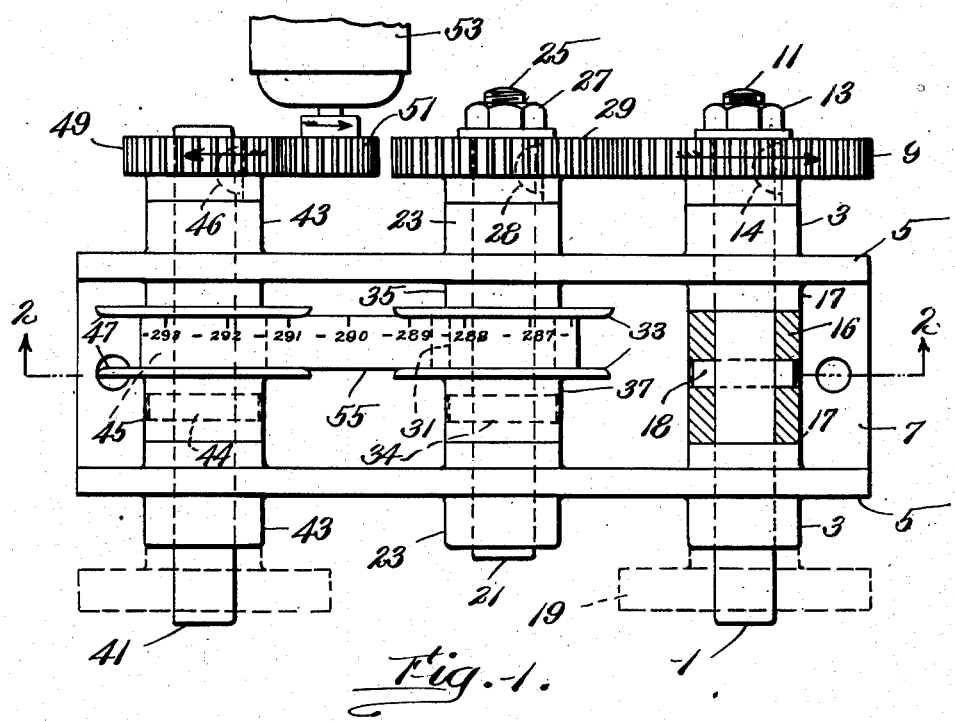
Figure 2:
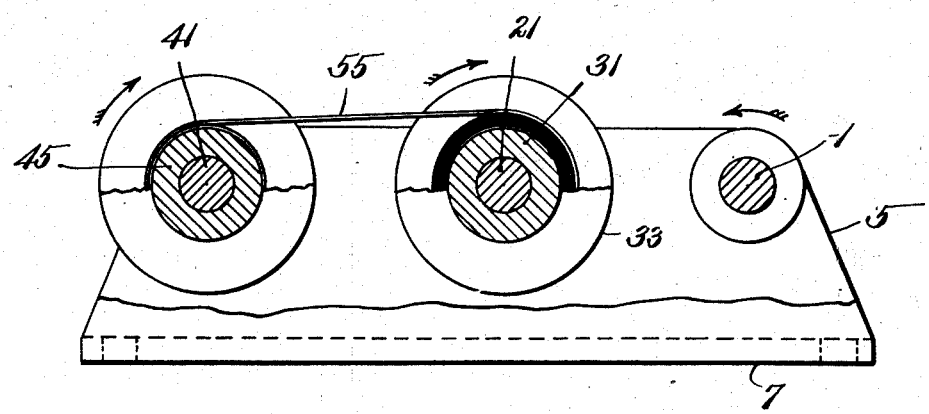
Fig. 2 is a section on line 2—2 of Fig. 1.

The unit shown in Figs. 1 and 2 comprises a shaft 1 mounted in bearings in hubs 3, 3, formed on flanges 5 of a base 7 which may be either a separate part as shown herein or a part of the framework supporting the change-gearing of a lathe or other machine tool. This shaft has a spur gear 9 fixed on its threaded end 11 by means of a nut 13 and key 14, and a collar 16 is fixed on the shaft by a pin 18 between the hubs 3. Drive-shaft 1 is actuated, through connections such as the gear 19 shown in dotted lines, from the main drive of the machine at a constant speed and with capacity for reversal of its direction of rotation.

An intermediate shaft 21, mounted in flanges 5 of the base 7 within bearings in hubs 23 thereon, has fixed on its threaded end 25 by means of nut 27 and key 28 a spur gear 29 meshing with and driven by gear 9. The ratio between gears 9 and 29 may be as desired, and admits of being varied as needed by replacement with gears of other ratio. Fixed to shaft 21 between flanges 5 is a rotating winding surface 31 in the form of a spool or pulley having a cylindrical barrel and flanges 33, this winding surface being fixed on shaft 21 by a pin 34 put through the hub of the spool and through the shaft 21.

A third shaft 41 is also rotatably mounted in the flanges 5 within bearings formed inside hubs 43 on said flanges, this shaft having fixed thereon by a pin 44 a winding surface 45 preferably identical with the winding surface 31 on shaft 21, namely in the form of a spool or pulley having flanges 47. One end of shaft 41 has fixed thereon by a key 46 a spur gear 49 meshing with a spur gear 51 fixed on the shaft of a torque motor 53 of known construction, which when energized with electric current tends to rotate in the direction indicated by the arrow on gear 51 and thus tends constantly when energized to rotate shaft 41 counterclockwise as indicated by the arrow on gear 49. This torque motor 53 is also designed for full-load stall without injury thereto, and with the current on may be turned backward against its proper direction of travel without harm, its action thus being equivalent to a weight hung from a cord wound around a pulley fixed on a shaft carrying gear 51.

A flexible non-stretchable transmission member 55 preferably in the form of a thin polished steel tape or strip, on the order of 50 feet in length by 1/64 inch in thickness and of any desired width, has its opposite ends respectively fastened to one of the hubs 31, 45, with the balance of its length wound tightly about such hubs and stretched in taut relation from one of such windings to the other as shown in Fig. 2, through the action of torque motor 53, which action tends to wind the tape off from hub 31 and onto hub 45. Such travel and winding of the flexible tape 55 from hub 31 to hub 45 occurs only when shaft 1 is actuated from the main drive of the machine to rotate in the direction indicated by the arrow on gear 9 in Fig. 1, which movement produces a corresponding opposite rotation of shaft 21 letting off the strip from hub 31. However, when shaft 1 is rotated in the other direction, counterclockwise as indicated by the arrow in Fig. 2, the hub 31 is rotated in a clockwise direction, shown by the arrow, winding the tape onto the latter hub and through corresponding unwinding of the tape from hub 45 positively driving hub 45 and its shaft 41 in a clockwise direction.

Since the tape held on each of the hubs 31, 45, is wound upon itself, the effective radius of the pulley constituted by each hub plus the superposed convolutions of tape thereon is constantly changing as each turn of tape is wound on or off of the respective hubs. Thus, when the tape is being wound onto hub 31 on the driving shaft 21, the driven shaft 41 will travel at a constantly increasing rate of rotation while the number of rotations of shaft 21 per unit of time remains constant. On the other hand, when the direction of rotation of shaft 1 is reversed, causing hub 31 on shaft 21 to let off the tape 55, torque motor 53, which has been energized all the while, but hitherto overpowered, is now able to rotate shaft 41 counterclockwise in Fig. 2 to take up the tape 55 as fast as let off from hub 31. Since shaft 21 always rotates at constant speed, and since the effective radius of the pulley constituted by hub 31 plus the thickness of windings of tape thereon is being reduced by this procedure while the effective radius of hub 45 plus the thickness of the windings is correspondingly constantly increasing, it will be obvious that the rate of angular rotation of shaft 41 is being constantly reduced. If, now, the driven shaft 41 is connected for instance to rotate the work spindle of a lathe or grinder, either directly or through gearing, it will be obvious that rotation of the shafts 21 and 41 clockwise in Fig. 2 will continuously increase the rate of rotation of the work carried by the work spindle; conversely, the rate of rotation of the work spindle and of the work will be continuously reduced when these shafts are being driven counterclockwise. If driven shaft 41 be connected to actuate the feed screw of a lathe, the speed of rotation of the feed screw will be continually increased when the hubs 31, 45, are turning clockwise in Fig. 2, and continually decreased when the hubs are turning in the opposite direction. Thus a tool-slide or carriage may be caused to move at a gradually increasing rate in one direction and at a gradually decreasing rate in the opposite direction as it travels along the work. Finally, continuously varying rates of rotation of both the work and the feed screw controlling the slide or carriage on which the cutting tool is mounted may be had by using two of these variable speed units, one controlling the work spindle and the other the feed screw for the tool-slide.

The rate of change, that is the rate of increase or decrease of the speed of the driven shaft 41 with respect to the constant speed of shaft 21, is greater in proportion to the disparity between the effective radii of the two hubs 31 and 45 plus the windings thereon. In all ordinary uses, only a relatively small portion of the length of the tape 55 will be transferred back and forth from one hub to the other, and hence it is desirable to know definitely what portion of the length of the tape is thus in use. For this purpose, the midpoint in the length of the tape will be distinctly marked, and suitable unitary sub-divisions of the length of the tape, serially numbered for identification and running both ways from such midpoint, will be stamped on the tape after the manner indicated in Fig. 1. Thus, by transferring back and forth from one hub to the other a few feet of the tape on either side of the midpoint of its length, a minimum rate of increase and decrease of the speed of shaft 41 is obtained, while by working similarly with the last few feet of tape wound onto either hub the maximum rate of increase or decrease in the varying speed of driven shaft 41 is obtained, and of course any desired intermediate rate may also be obtained by selecting the desired working part of the length of the tape. Thus, for example, with a tape 1/64 inch thick wound onto hubs of 1.75 inch minimum diameter, and winding up to a maximum diameter of 4.00 inches through the use of a maximum of 72 turns of tape, if the tape is evenly distributed between the two hubs at the beginning of the operation, driven shaft 41 will rotate 1.01 times faster than driven shaft 21 when the first turn is withdrawn by rotation of shaft 21, and shaft 41 will rotate 1.23 times faster than shaft 21 after the 10th turn is withdrawn from shaft 41. But if all but the last ten turns have been removed from hub 45, removal of the first of these remaining ten turns will cause shaft 41 to rotate 1.81 times faster than shaft 21, while the removal of the last turn on hub 45 will drive shaft 41 2.26 times as fast as driving shaft 21 rotates. Thus, the rate of change in the velocity of driven shaft 41 is more than twice as great when the ends of the tape are used than when the mid-length thereof is employed.

In many of its uses, as in a lathe where the variable speed unit is used to traverse the tool carriage or vary the rate of rotation of the work during the traverse of the tool carriage, the tool can be allowed to work during such movement of the carriage in both directions along the work, through a simple reversal of the direction of rotation of constant-speed drive-shaft 1. This is so because it entails merely a winding-back of the same length and the identical portions of the tape during the reverse travel of the carriage as were wound off during the opposite direction of traverse. The rate of change at any given point in the travel of the tool carriage is thus equal in both directions of such travel, but merely plus when traveling in one direction and minus when traveling in the other direction. The necessary provisions for automatic reversal of drive-shaft 1 being known and conventional in many machine tools, they are not illustrated herewith. The same results are obtained when the unit is employed to vary the rate of rotation of the work in a grinding machine, as for instance in grinding the flutes of a drill with a gain-twist, reversal of drive-shaft 1 being there employed to cause the grinder to do work in both directions of its traverse. Thus, the selected rate of change determined by the part of the length of tape 55 chosen for a particular job, is retained throughout the job by the device of alternately winding the tape as far as wanted in one direction and thereupon rewinding in the opposite direction exactly the length of tape thus drawn off, in preparation for another unwinding in the original direction.

It may be noted that the drive of the tape and hence of the driven shaft 41 is positive in the clockwise direction of rotation of the spools 31, 41, of Fig. 2, and yielding when rotated in the opposite direction, since torque motor 53 is a form of take-up winding up what tape is let off through the clockwise rotation of drive-shaft 1, motor 53 having speed in excess of that required but limited power, the latter being adjusted to the job in hand by appropriate changes of gears 49 and 51.

Figure 3:
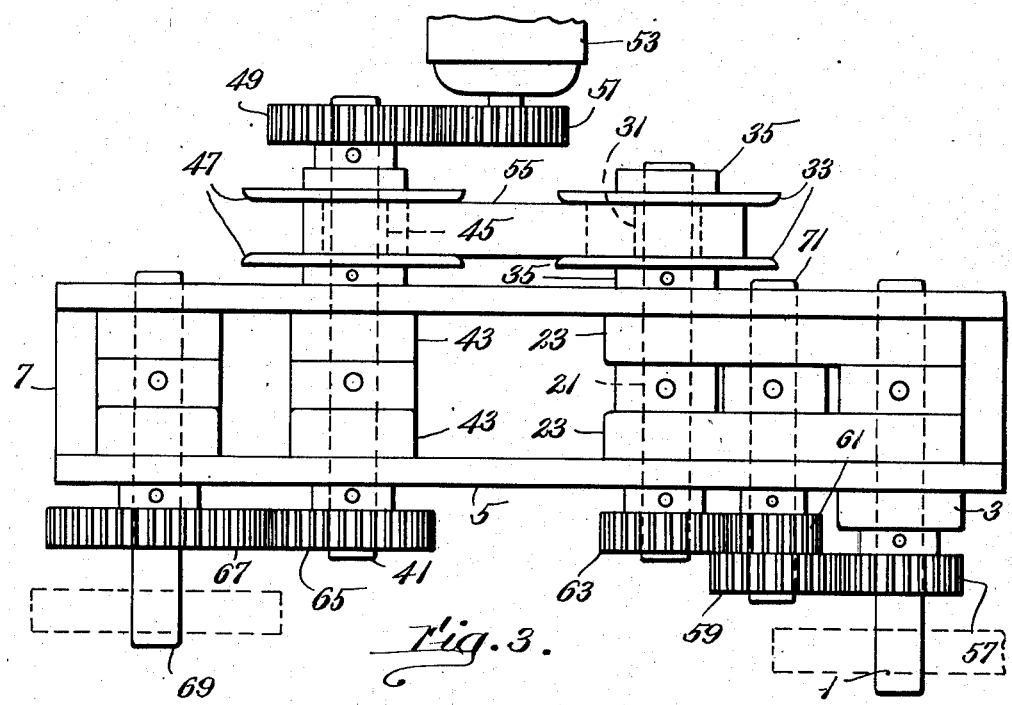
Fig. 3 is a plan view of an alternative form of the invention.
Figure 4:
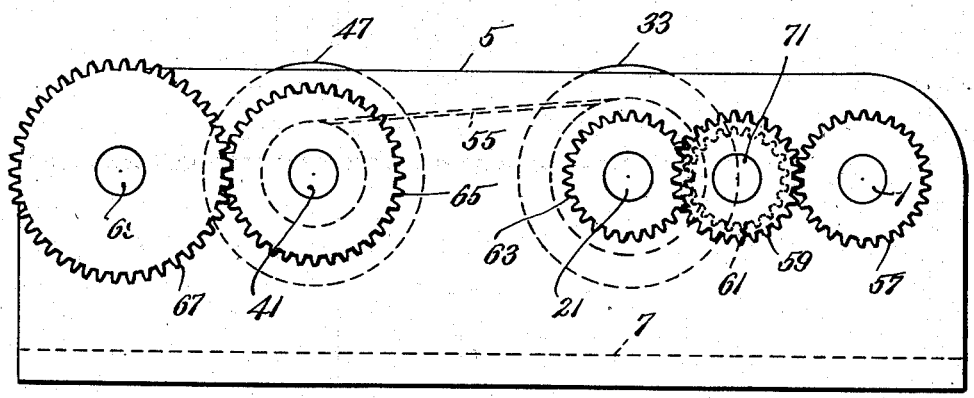
Fig. 4 is a front elevation of the structure shown in Fig. 3.

The rate of change of speed derived directly from the tape winding from a pulley of constantly diminishing radius to one of constantly increasing radius is subject to further modification through the introduction of additional gearing. This is shown in the unit illustrated in Figs. 3 and 4, where drive-shaft 1 drives the first tape-spool shaft 21 through compound intermediate gears 57, 59, 61, and 63, imparting a substantially reduced speed to driven shaft 21, both in taking up and letting off the tape 55. In addition, driven shaft 41 carrying spool 45 does not drive the tool-carriage or work-spindle or other machine part as directly as before, but transmits its motion through intermediate reduction gearing 65, 67, to an additional shaft 69 which is thus rotated at a slower speed and likewise with greater power to transmit the constantly changing motion to the work or tool or other part of the machine. For convenience, the shaft 69 and also the intermediate shaft 71 carrying compound gears 59, 61, are mounted in suitable bearings in the flanges 5 of base 7 so as to form a permanent part of the unit. Tapes 55 of different thickness are also employed to vary the rate of change.

The manner of transmitting the constantly varying drive from shafts 41 or 69 to the machine parts to be propelled thereby, and of optionally disconnecting the variable speed unit and driving directly through the standard gearing of the lathe or other machine tool, is adapted to the needs of the particular machine and the existing structure therein, generally following the conventional methods of gear changing and therefore not needing to be specifically illustrated herein.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof.

What I do claim is:

1. Transmission unit for actuating machine parts, having in combination a power-imparting element rotating optionally in both directions at constant speed, winding means revolved by such element, a rotatable member to be driven alternately in opposite directions at controlled changing speed, a flexible member unwinding from the rotatable member and winding onto the winding means in superposed convolutions, and means acting to rotate the rotatable member in the winding-on direction.

2. Transmission unit for actuating machine parts, having in combination a shaft imparting power and rotating optionally in both directions at constant speed, a second shaft to be driven at changing speed, and driving connections between the two shafts including a rotating element driven by the first shaft, a rotating element in driving relation with the second shaft, and a flexible member wound in superposed convolutions on the two rotating elements, and means acting to rotate the second rotating element in the winding-on direction.

3. In a machine tool, in combination, a drive-shaft rotated optionally in both directions at constant speed, a driven shaft, constant driving connections between the two shafts driving the driven shaft at a continuously changing rate in one direction and acting as a let-off permitting the driven shaft to rotate in the other direction at a continuously changing rate, and means propelling the driven shaft in such latter direction.

4. In a machine tool, in combination, a drive-shaft rotated optionally in both directions, means for thus driving the drive-shaft, a driven shaft, a tape winding off from the driven shaft and onto the driving shaft in superposed convolutions when the latter shaft is power-driven in one direction, and conversely winding off from the driving shaft and onto the driven shaft in superposed convolutions when the driving shaft is power-driven in the other direction, and additional and separate driving means tending always to rotate the driven shaft in its winding-on direction.

5. In a machine tool, in combination, a driving element rotated at constant speed, a winding surface rotated optionally in both directions thereby, a second winding surface, a flexible element wound upon itself about both winding surfaces, means tending to rotate the second winding surface in winding-on direction, and means actuated by the rotation of such second winding surface controlling the rate of operation of the machine parts.

6. In a machine tool, in combination, a shaft controlling the rate of operation of a machine part, an electric torque motor rotating such shaft in one direction, a flexible member wound around such shaft, and means traveling at constant angular velocity drawing off and thus unwinding portions of the length of such flexible member to rotate such shaft in the opposite direction, overcoming the torque of the torque motor.

7. In a machine tool, in combination, a rotatable element controlling the rate of operation of a machine part, a flexible member wound around such element, a second rotatable element about which the flexible member is wound upon itself, and rotated at constant speed in either direction as desired, and means rotating the first rotatable element in winding-on direction, acting when the second rotatable element is rotated in a direction to let off from itself the flexible member wound thereon.

8. In a machine tool, in combination, a shaft controlling by its rate of rotation the relative rate of movement of the work with respect to the tool, a winding surface rotating with such shaft, a second shaft having a constant speed but reversible direction of rotation, a winding surface rotating with such second shaft, a flexible strip wound upon both winding surfaces in superposed convolutions, and a torque motor tending to rotate the first shaft in its winding-on direction.

EDGAR A. TERRELL.